United States Patent [19]
Butts

[11] Patent Number: 5,176,025
[45] Date of Patent: Jan. 5, 1993

[54] PIPELINE SECONDARY CONTAINMENT SYSTEM AND METHOD

[75] Inventor: Nicholas E. Butts, Kanata, Canada

[73] Assignee: E. O. Butts Consultants Ltd., Nepean, Canada

[21] Appl. No.: 657,610

[22] Filed: Feb. 19, 1991

[51] Int. Cl.⁵ .............................................. G01M 3/28
[52] U.S. Cl. ................................................. 73/40.5 R
[58] Field of Search .......................... 73/40.5 R, 49.2; 340/605

[56] References Cited

U.S. PATENT DOCUMENTS

| | | | |
|---|---|---|---|
| 3,564,526 | 2/1971 | Butts | 340/242 |
| 4,568,925 | 2/1986 | Butts | 340/605 |
| 4,805,444 | 2/1989 | Webb | 73/40.5 R |
| 4,844,287 | 7/1989 | Long | 72/49.2 X |
| 4,922,232 | 5/1990 | Bosich | 73/49.2 X |
| 5,040,408 | 8/1991 | Webb | 73/40.5 R |

FOREIGN PATENT DOCUMENTS 978614 11/1975 Canada .
1235872 5/1988 Canada .

Primary Examiner—Hezron E. Williams
Assistant Examiner—Joseph W. Roskos

[57] ABSTRACT

A pipeline system with a localized environment for preventing, detecting, and containing leakage from a subterranean pipeline transporting hydrocarbon liquids and gases is disclosed. A steel pipe is enclosed in a sleeve of high density polyethylene and overlaid with a layer of geotextile material. Positioned in the interstitial space between the pipe and sleeve is a layer of geotextile material impregnated with hydrated lime which dissolves in the presence of water to create a highly alkaline solution to protect the pipe. Also positioned adjacent the inner layer are leak sensors/monitors for detection of leaks of hydrocarbon fluids and aqueous solutions.

20 Claims, 4 Drawing Sheets

PIPELINE SECONDARY CONTAINMENT SYSTEM AND METHOD

BACKGROUND OF THE INVENTION

The present invention relates to the field of pipeline protection, and in particular to the creation of a localized environment for preventing, detecting and containing leakage from subterranean pipelines transporting hydrocarbon liquids or gases.

DESCRIPTION OF THE PRIOR ART

Pipelines, as they are presently designed and built, have several inherent problems involving corrosion protection as well as leak-location and secondary containment of leaking product. In an area with an active ground water table, migration of the pipeline products from a small leak of only a few gallons can travel great distances undetected. In such a situation, the leaked product can end up polluting wells and reservoirs, with the potential of affecting the water source of a fairly large population before detection.

Corrosion is an electrochemical process, requiring an anode and a cathode electrically connected in an electrolyte. Corrosion is a self-poisoning process, and in order for it to continue over a long period of time, a mechanical or chemical means of depolarization or depassivation must exist. Interference with any one of these requirements will reduce the corrosion rate.

Section 23 of the Chemical Engineers' Handbook (Perry & Chilton, 1973) deals with methods to combat corrosion. A widely used method of protecting piping is the use of coating materials including tape, plastic, enamel, epoxy and urethane paint. The coatings separate the anode and cathode or isolate the electrolyte from the metal, as long as the coating is free of defects. Unfortunately it has been found that pinholes in a coating result in a localized corrosion rate 100 to 1000 times that of an equivalent bare surface. Pipeline coatings are subject to damage during handling, installation and operation. Coatings may separate from the pipeline allowing water migration under the coating which causes the formation of corrosion cells which may accelerate corrosion of the pipe.

In addition to the coatings it is known practice to use cathodic protection for the protection of metals buried underground. Present pipeline designs frequently include cathodic protection, in accordance with the known technology, which is effected by connecting the surface of the steel pipe either to a buried sacrificial anode or to an impressed current source. However, cathodic protection is unable to protect from corrosion caused by water migration under the protective coating where the protective coating acts as an insulator. If the coating separates from the pipe, water may migrate under the coating and set up a corrosion cell using the coating as a shield against the cathodic protection.

In currently used pipeline designs there is no way of ascertaining before installing the pipe whether the coating is defective or whether subsequent to installation, the coating has been damaged or a corrosion cell has been formed. Expensive periodic maintenance inspections are sometimes used. At present, pipeline integrity is tested by use of a sensor mechanism referred to as a "sensor pig" which travels through the pipeline measuring pipe wall thickness. This is an expensive and time consuming method as the sensor pig sends back to a centralized computer a mountain of data and its progress through the pipeline is slow. Moreover, the sensor pig is not always capable of detecting pinholes or small leaks in the pipeline. Most sensor pigs only detect a metal loss of more than 50% which represents quite advanced corrosion.

Another less desirable method of finding out if there is a problem with the coating of the pipe, is by the formation of leaks in the pipeline. Leaks are, at present, usually detected by monitoring for a sudden drop in pressure at a pumping station or for a large discrepancy between the volume of product output over the volume of product input. Both of these monitoring methods of detection are only effective for large leaks of pipeline product. Another method of leak detection is by routine inspection of the pipeline, usually done by aircraft. This method of detection is also only effective when there is a relatively large leak and the product comes to the surface and kills vegetation.

It has been found that iron becomes increasingly passive in the presence of alkalies, a pH value greater than 10 in the pipeline environment also raises the pH of the iron surface and passivates the surface, and corrosion correspondingly decreases. A buried steel tank or pipe can be protected from corrosion by backfilling with hydrated lime $(Ca(OH)_2)$ which will create a highly alkaline solution in contact with ground water.

A containment and leak detection method for petroleum products stored in subterranean tanks is described in U.S. Pat. No. 4,568,925 of Feb. 4, 1986 to N. E. Butts. This patent teaches a method for containing leakage of petroleum products in an impervious enclosure of welded high density polyethylene. The system of the present invention offers more protection for the pipeline and has included corrosion protection between the pipeline and the enclosure.

SUMMARY OF THE INVENTION

The pipeline protection system of the present invention has been developed to address problems of current pipeline design by creating a favourable localized environment around a steel pipe. This system protects the pipeline from harmful outside forces while providing containment of potential pollutants in the event of a leak. Containment is provided by a linear High Density Polyethylene (HDPE) sleeve. The interstitial space between the steel pipeline and the sleeve contains a porous geotextile impregnated with a material such as hydrated lime to inhibit corrosion of the pipe in the event that the environment is breached and admits water. Optionally cathodic protection may be installed in the interstitial space to further protect the steel pipe. The sleeve provides secondary containment in the event of a leak of hydrocarbon fluids. The pipeline system of the invention may be segmented to prevent migration of leaking product all along the pipeline.

In each segment of the pipeline a sensor package may be installed to monitor the pipeline localized environment, the status of the cathodic protection system and a leak detection and location system.

In the system of the present invention the HDPE sleeve is protected from external forces by an overlay of geotextile material. This outer layer is of particular importance in those sites where there is significant ground movement which has been known to cause wear on the sides of steel pipelines.

The system of the present invention is an improvement over the prior art in that it is capable of detecting and containing small incipient leaks which might ordinarily migrate long distances in an active water table.

BRIEF DESCRIPTION OF THE DRAWINGS

In drawings with illustrate embodiments of the invention.

DESCRIPTION OF THE PREFERRED EMBODIMENT

Figure 1:
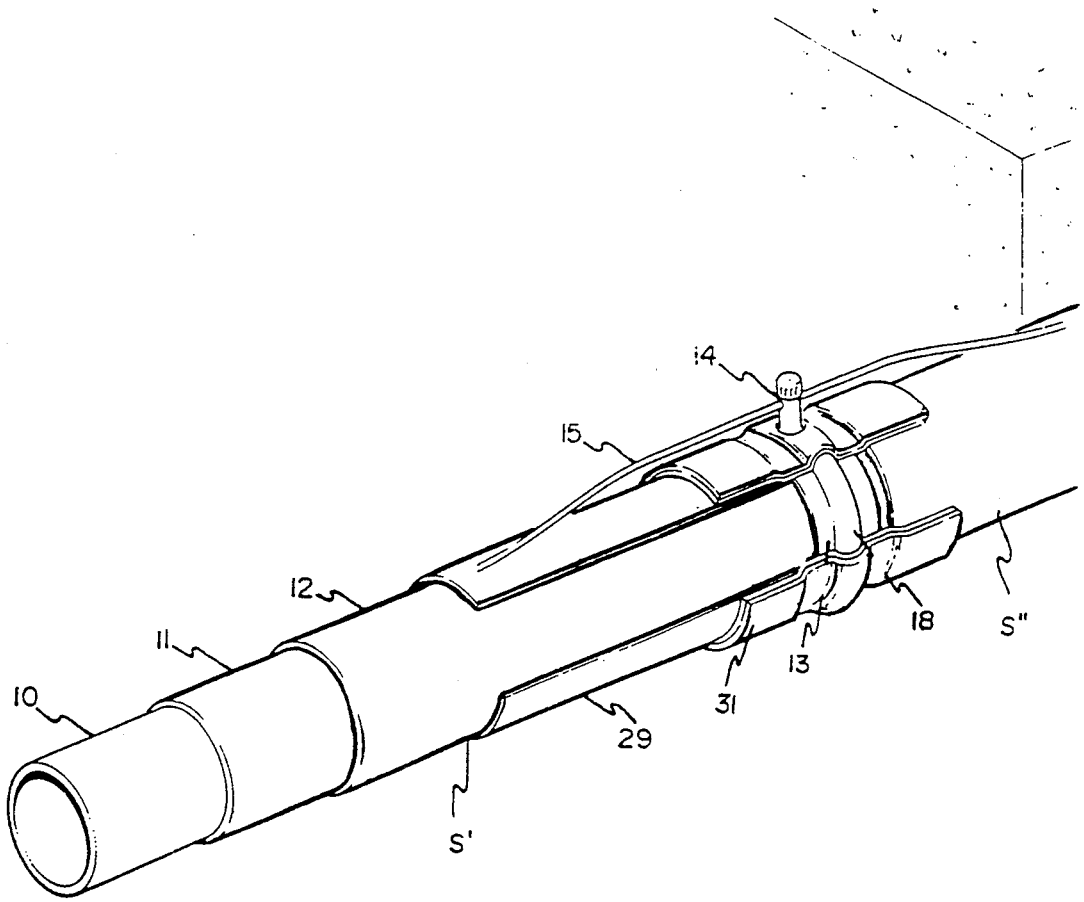
FIG. 1 is a perspective view partly cut away of the pipeline system of the present invention.
Figure 2:
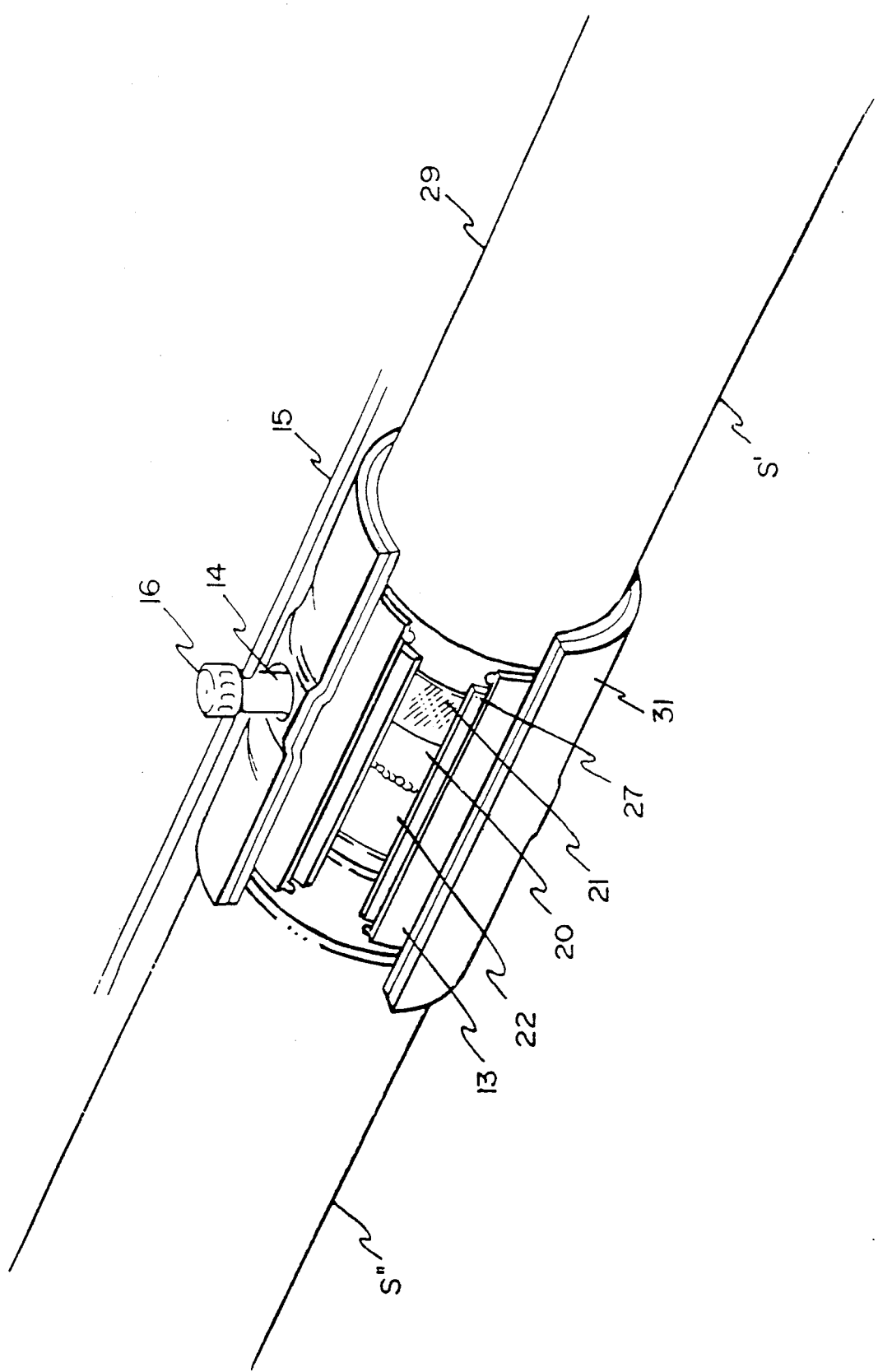
FIG. 2 is an enlarged view of the joint between sections of pipeline with the collar partly cut away.
Figure 3:
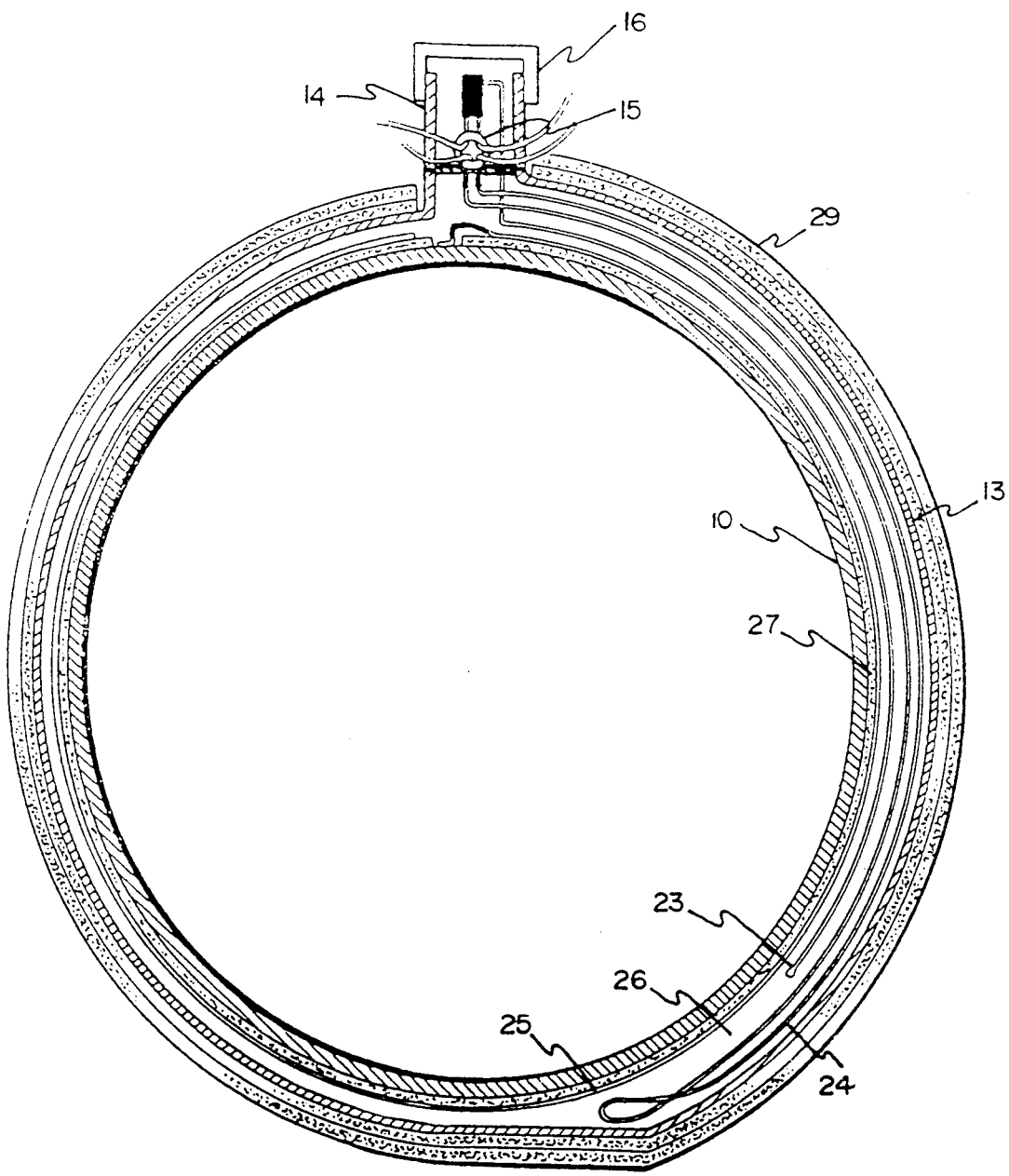
FIG. 3 is a cross section of the joint between adjacent sections of pipeline, showing the concentric layers of the system.
Figure 4:
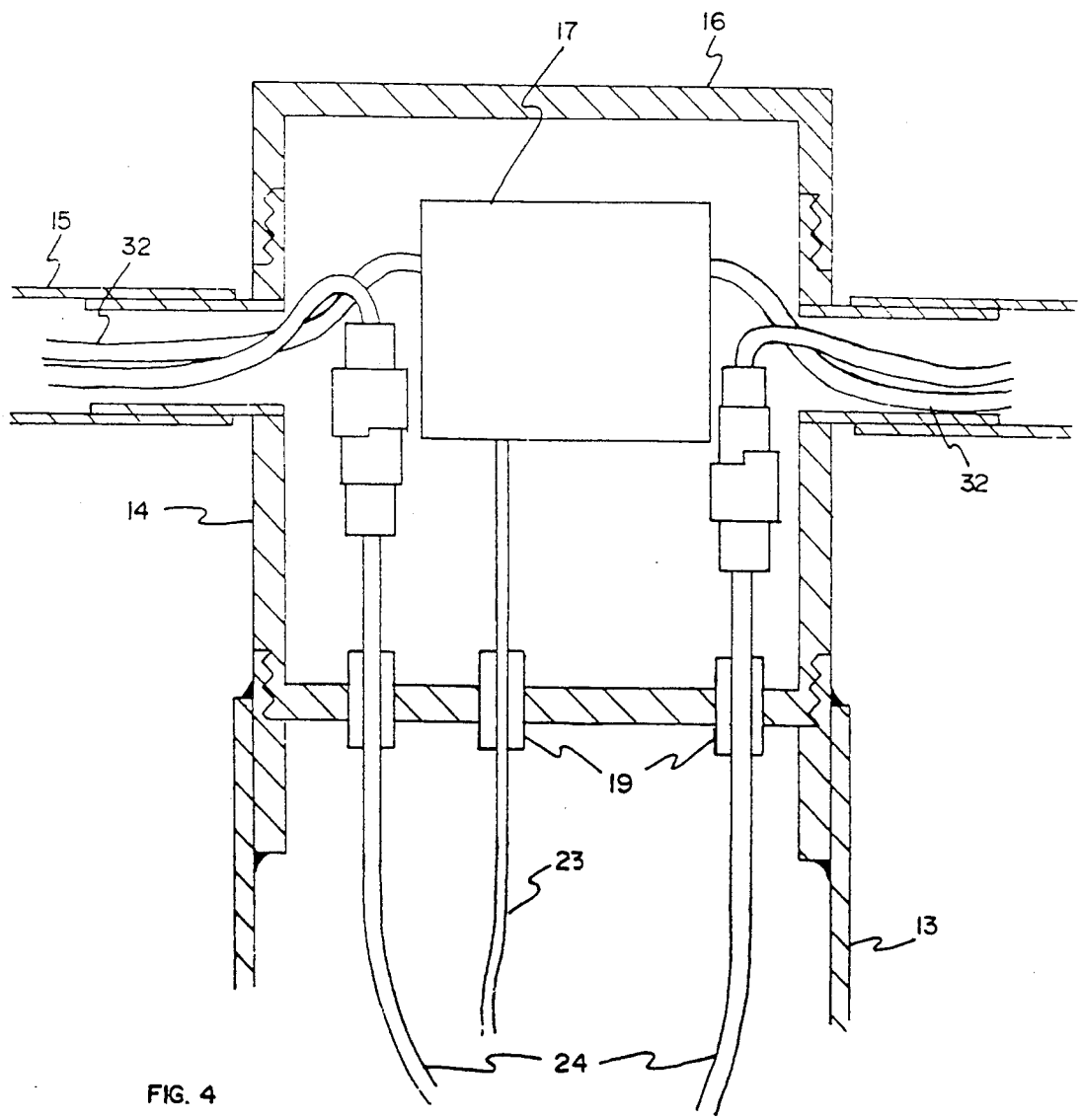
FIG. 4 is an enlarged view of the riser pipe in cross section.

The pipeline system of the present invention has four components: a steel pipe 10, an inner geotextile layer 11 concentric with the pipe 10, an HDPE sleeve 12 and an outer geotextile layer 29. Corrosion protection, cathodic protection, and leak detection equipment may also be provided in the interstitial space 26 between the steel pipe 10 and the sleeve 12. The secondary containment system may be divided into pipe segments S', S" of, for example, forty foot lengths.

The steel pipe 10 of the pipeline system is clad with a porous inner layer 11. Inner layer 11 is a wrap of nondegradable geotextile material for example of nonwoven high density polypropylene, preferably of a weight of approximately 400 grams per square meter and a thickness of approximately 3 mm. Inner geotextile layer 11 is commercially available in 3.3 and 4.0 meter widths from Terrafix, Toronto, Canada or Dominion Textiles, Charlotte, N.C. Such geotextile is a man-made heavy fabric used in soil stabilization and hydraulic engineering applications. The inner layer has a cushioning effect on the pipe, protecting it from damage by external forces. Inner layer 11 is one or two thicknesses of the geotextile material which may be impregnated with hydrated lime or another material to inhibit corrosion, dependent on the site. The polypropylene geotextile material is inert in a highly alkaline environment. In the event that the environment is breached and admits water the hydrated lime dissolves forming a solution of pH 12.6. In an alkaline environment (pH > 10) the pH of the metal surface of the pipe increases and the corrosion rate correspondingly decreases. The porous nature of the geotextile enables the fluid to come into contact with the leak detection equipment. Inner layer 11 may be wrapped around steel pipe 10 with an overlap of about one-quarter the circumference and heat welded or taped closed. Inner layer 11 can be factory installed on the steel pipe 10 or installed in the field.

A second protective layer of the containment system is sleeve 12. Sleeve 12 is a protective wrap of linear HDPE, for example of 2.5 mm thickness, positioned over the inner geotextile layer 11 and pipe 10 creating an interstitial space 26 which protects the pipe 10 from corrosion by soil chemistry, biological attack, and stray electrical currents.

Each sheet of HDPE forming the sleeve 12 encircles the inner layer 11 and pipe 10 with an overlap of about one-quarter the circumference and is sealed with a commercially available HDPE weld. Each sheet of HDPE forming the sleeve 12 is also welded to an adjacent sheet of HDPE thereby forming an impermeable secondary containment system for the pipeline. Sleeve 12 can be factory installed on the pipe segments S' and S" or installed in the field.

Factory manufactured pipes made in accordance with this invention are preferably placed in a trench so that the double thickness of the sleeve 12 is at the bottom. With non-factory manufactured pipes made in accordance with this invention, the sleeve 12 is wrapped around the steel pipe 10 and inner geotextile layer 11 with the quarter overlap at the top of the pipe 10; once the welding of HDPE is completed, the sleeve 12 could be rotated so that the double thickness of HDPE is at the bottom of the pipe 10. This double thickness of HDPE of sleeve 12 placed at the bottom of the pipe 10 greatly enhances the puncture resistance of the pipeline system as the greatest puncture stress point against a pipe is where its weight rests in the trench. A suitable form of HDPE weld is that sold by Fourtake Systems of Ottawa, Canada as Fustitch and disclosed in Canadian Patent Number 1,235,872 of May 3, 1988 to Butts et al contents of which are incorporated hereinto by reference. This type of weld allows for the sealing of both ends of the overlap. In the event that one layer of the overlap of the HDPE sleeve 12 is punctured, the integrity of the containment system is maintained.

Collar 13 made of linear HDPE, preferably overfits each joint between pipe segments S' and S". Collar 13 has a protective inner layer 27 of 1 or 2 thicknesses of polypropylene geotextile material, preferably impregnated with hydrated lime positioned between the pipe joint and the collar 13. The collar 13 is ring-shaped with a shoulder 18 on one side which tapers into the ring near the bottom. Stand pipe 14 is screwed on to the top of the shoulder 18 of collar 13 and can be welded also if desired. Stand pipe 14 allows access to the interstitial space 26 for the monitoring of the integrity of the environment of each segment S' and S". Explosion proof fittings 19, HDPE welds, and a stand pipe cap 16 seals the secondary containment system from its environment. A circuit board 17 may be located in the stand pipe so that the interstitial space can be remotely monitored. The circuit board 17 is powered by power cable 32. Through the cable conduit 15 and each stand pipe 14 is pulled cables for the leak detection system, sensors/monitors and if necessary a power cable for the impressed current cathodic protection system. Cable conduit 15 may be, for example a one-inch diameter polypipe preferably brightly-colured, which connects the stand pipes 14 along the length of the pipeline. Cable conduit 15 is buried and runs parallel and preferably above the buried pipeline.

Since the interstitial space 26 will normally be in a dry condition, the alkaline environment would not exist and the electric potential for cathodic protection would not generally be utilized. The breach of the environment by water can be monitored by a pH sensor 23 or by a water sensor or reference anode (not shown). Should water permeate the interstitial space 26, the hydrated lime impregnated in inner geotextile layer 11 dissolves creating a highly alkaline solution thereby protecting steel pipe 10. If there is a subsequent drop in pH this is an indication that the hydrated lime of inner geotextile layer 11 is consumed or washed away by ground water entering and exiting the interstitial space 26 and cathodic protection may be used to prevent corrosion. This is effected by connecting the surface of the steel pipe 10 either to a sacrificial anode 25 or to an impressed current source (not shown). A sacrificial anode 25 may be located in the interstitial space 26 and may be used to provide cathodic protection. The size of the sacrificial anode is dependent on the size of the steel pipe 10.

Leaks of hydrocarbon fluids can be detected by a sensor 24 located in the interstitial space 26. A suitable form of sensor is the cable that is sold by Catch Inc. of Ottawa, Canada as Linear System and as disclosed in Canadian Patent Number 775,758 of Jan. 9, 1968 to E.O. Butts (corresponding to U.S. Pat. No. 3,564,526) and Canadian Patent Number 978,614 of Nov. 25, 1975 to Wolkowski, contents of all of which are incorporated hereinto by reference. As disclosed therein, two conductors are separated by insulation materials which are subject to degradation upon contact with petroleum products such as gasoline or heating oil. Sufficient degradation allows the conductors to come into contact with each other and thereby energize an alarm or other type monitor. An alternative would be the use of a gas sensor head or sniffer installed in the interstitial space and wired to an alarm.

Each pipe segment S', S" has two ends 20, 22 and one collar 13. To isolate each segment S', S" from the others, sleeve 12 may be bonded to the pipe at end 20 by heat-shrinkable material 21, such as the Wraparound Gas Pipe Sleeve sold under the trade mark GAPS 7 available from Raychem, Calif., or by another mechanical means (not shown) to the pipe 10. At the opposite end 22 of each segment S', S", the sleeve 12 is welded to the collar 13. Each segment S', S" thus becomes a closed system by containing fluids and by preventing migration along the full length of the pipeline. The subdivision of the pipeline into individual isolated pipe segments S', S" allows for more accurate monitoring and leak detection as well as easier cleanup, repair, and replacement.

Around the sleeve 12 of each segment S', S" is a porous outer layer 29 composed of a heavy non-degradable geotextile for example of nonwoven polyester, preferably with a weight between approximately 400 to 1600 grams per square meter and with a thickness of approximately 13 mm. The polyester material is less susceptible to external forces than is the polypropylene of the inner layer 11. Outer layer 29 of geotextile material is commercially available in 3.3 and 4.0 meter widths from Terrafix, Toronto, Canada or Dominion Textiles, Charlotte, N.C. This final wrap of the pipeline with geotextile before backfilling the trench is referred to as "rock sheeting". The outer layer 29 is wrapped approximately one and one-quarter times around the sleeve 12 and heat sealed or taped closed. Once sealed, the outer geotextile layer 29 is rotated so that the double thickness of the geotextile is at the bottom of the pipe 10 for added protection against puncture. Collar 13 is also wrapped with the polyester geotextile material layer 31 which may be heat fused.

The pipeline protection system can be installed on the pipe segments in the factory or it can be installed on new pipe segments in the field. Existing pipelines can be reconditioned by the same method first by unearthing the pipeline and cleaning the pipe surface to near white metal. Because the secondary containment system for each pipeline segment S' and S" is sealed it would be possible to install the system of the present invention on portions of a new or existing pipeline.

I claim:

1. A method of creating a localized environment for preventing, detecting and containing leakage from a subterranean pipeline transporting hydrocarbon liquids and gases, comprising:

positioning a protective inner geotextile layer concentric with said pipeline, positioning leak sensing means adjacent said inner layer, connecting said leak sensing means to means for remotely detecting changes in the electrical characteristics of said leak sensing means, positioning a collar concentric with said pipeline, positioning a standpipe on said collar, positioning corrosion protection means in said inner layer, positioning cathodic protection means in said inner layer, enclosing said pipeline and said inner layer in an enclosure concentric with said pipeline, sealing said enclosure to said collar, positioning an outer geotextile layer around said enclosure concentric with said pipeline, positioning an outer geotextile layer around said collar concentric with said pipeline, connecting said leak sensing means in series through said standpipe to means for remotely detecting changes in the electrical characteristics of said sensing and protection means.

2. A method as claimed in claim 1 wherein said inner geotextile layer is formed from thicknesses of nonwoven high density polypropylene.

3. A method as claimed in claim 1 wherein said inner geotextile layer is impregnated with hydrated lime.

4. A method as claimed in claim 1 wherein said enclosure is formed from high density polyethylene.

5. A method as claimed in claim 1 wherein said enclosure is impervious to hydrocarbon liquids and gases and aqueous solutions.

6. A method as claimed in claim 1 wherein said collar is formed from high density polyethylene.

7. A method as claimed in claim 1 wherein said standpipe is formed from high density polyethylene.

8. A pipeline system with a localized environment for preventing, detecting and containing leakage of hydrocarbon liquids and gases, comprising:

a segment of steel pipe, a protective inner geotextile layer concentric with said segment, a collar positioned at one end and concentric with said segment, a standpipe positioned on said collar, said segment and said inner layer being enclosed in an enclosure concentric with said segment, said enclosure being sealed to said collar, an outer geotextile layer around said enclosure concentric with said segment, an outer geotextile layer around said collar concentric with said segment.

9. A pipeline system as claimed in claim 8 wherein said inner geotextile layer is formed from a thickness of nonwoven high density polypropylene.

10. A pipeline system as claimed in claim 8 wherein said inner geotextile layer is impregnated with hydrated lime.

11. A pipeline system as claimed in claim 8 wherein said enclosure is formed from high density polyethylene.

12. A pipeline system as claimed in claim 8 wherein said enclosure is impervious to hydrocarbon liquids and gases and aqueous solutions.

13. A pipeline system as claimed in claim 8 wherein said collar is formed from high density polyethylene.

14. A pipeline system as claimed in claim 8 wherein said standpipe is formed from high density polyethylene.

15. A pipeline system as claimed in claim 8 wherein a leak sensing means is positioned adjacent to said inner layer.

16. A pipeline system as claimed in claim 15 wherein said leak sensing means is connected to a means for remotely detecting changes in the electrical characteristics of said leak sensing means.

17. A pipeline system as claimed in claim 15 wherein said leak sensing means is connected in series through said standpipe to means for remotely detecting changes in the electrical characteristics of said sensing and protection means.

18. A pipeline system as claimed in claim 15 wherein said leak sensing means is selected from the group consisting of pH sensor, water sensor, reference anode, gas sensor head, gas sniffer, and petroleum leak indicator.

19. A pipeline system as claimed in claim 18 wherein said petroleum leak indicator is a pair of conductors separated by insulation material degradable upon contact with petroleum products.

20. A pipeline system as claimed in claim 8 wherein a cathodic protection means is positioned adjacent said segment.

* * * * *